United States Patent
Cravener

(10) Patent No.: US 11,591,069 B1
(45) Date of Patent: Feb. 28, 2023

(54) ACTIVE PROPROTOR-BLADE RETENTION SYSTEMS

(71) Applicant: Bell Textron Inc., Fort Worth, TX (US)

(72) Inventor: Kyle Thomas Cravener, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/554,949

(22) Filed: Dec. 17, 2021

(51) Int. Cl.
| | |
|---|---|
| *B64C 11/28* | (2006.01) |
| *B64C 29/00* | (2006.01) |
| *F16B 2/10* | (2006.01) |

(52) U.S. Cl.
CPC .......... *B64C 11/28* (2013.01); *B64C 29/0033* (2013.01); *F16B 2/10* (2013.01)

(58) Field of Classification Search
CPC ..... B64C 11/28; B64C 27/50; B64C 29/0033; F16B 2/10; F16B 2/12
See application file for complete search history.

(56) References Cited

U.S. PATENT DOCUMENTS

| | | | | |
|---|---|---|---|---|
| 4,301,982 A | * | 11/1981 | Tiemann | B64C 27/50 244/17.11 |
| 9,463,541 B2 | * | 10/2016 | Sherrill | B23Q 3/082 |
| 2005/0211825 A1 | * | 9/2005 | Hoynash | B64C 3/56 244/17.11 |
| 2015/0225077 A1 | * | 8/2015 | Dunmire | B64C 27/50 248/316.5 |
| 2020/0017205 A1 | * | 1/2020 | Foskey | B64C 27/605 |
| 2021/0078695 A1 | | 3/2021 | Foskey et al. | |
| 2021/0094683 A1 | | 4/2021 | Foskey | |

* cited by examiner

*Primary Examiner* — Woody A Lee, Jr.
*Assistant Examiner* — Elton K Wong
(74) *Attorney, Agent, or Firm* — Shackelford, Bowen, McKinley & Norton, LLP

(57) ABSTRACT

A system for retaining a folded proprotor blade in flight. The system includes a rotary actuator mechanism operable to generate torque via a shaft that rotates about an axis generally parallel to a chordwise direction of the folded proprotor blade, a pair of clamping arms movable in a direction generally parallel to a beamwise direction of the folded proprotor blade, a pair of linkage arms interoperably responsive to the rotary actuator mechanism and coupled between the rotary actuator mechanism and the pair of clamping arms, and a first guide rod extending between the pair of clamping arms in the direction generally parallel to the beamwise direction.

20 Claims, 9 Drawing Sheets

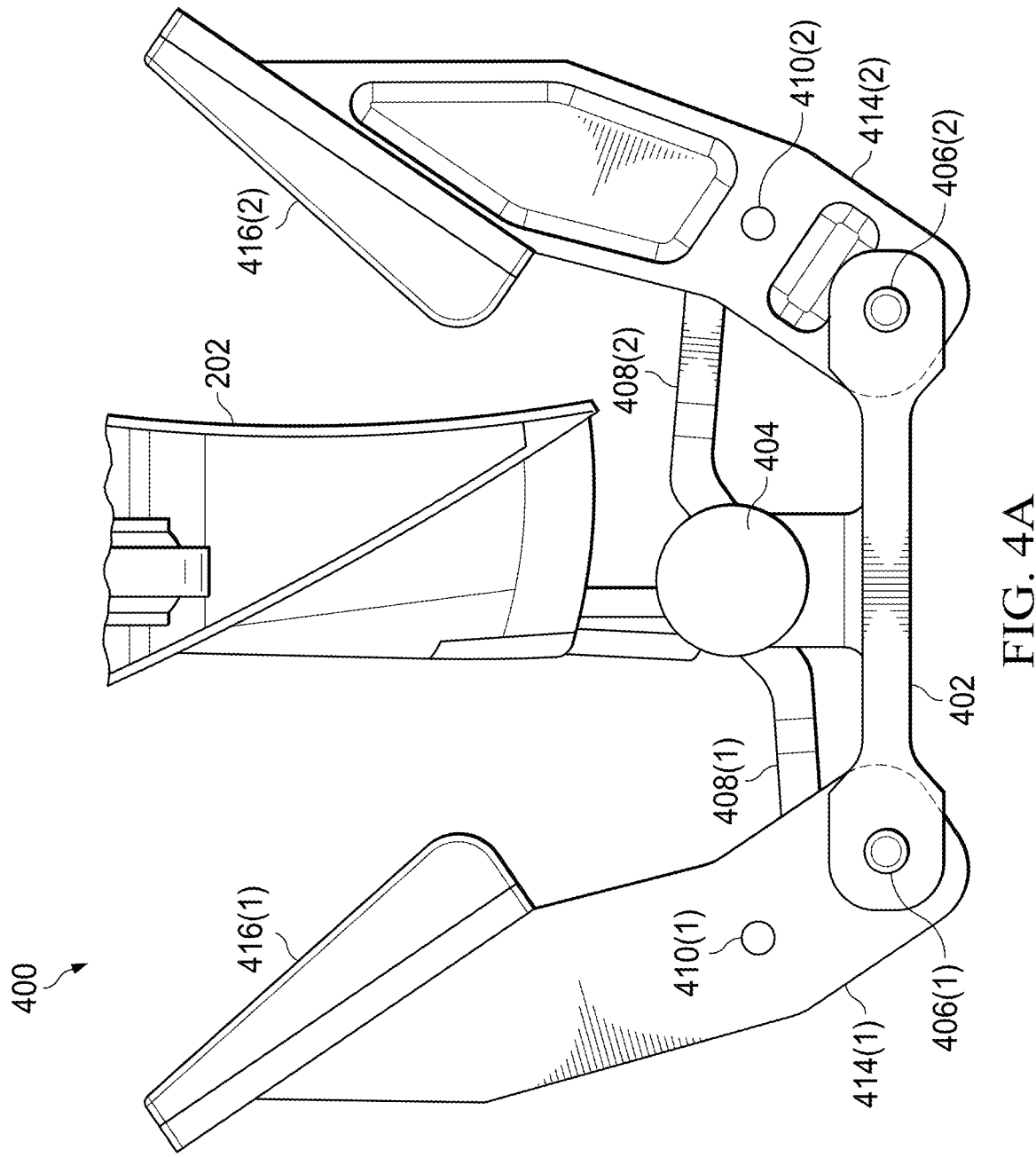

ACTIVE PROPROTOR-BLADE RETENTION SYSTEMS

TECHNICAL FIELD

The present disclosure relates generally to mechanisms for active proprotor blade retention and more particularly, but not by way of limitation, to mechanisms for actively retaining folded proprotor blades in a vertical take-off and landing ("VTOL") aircraft during flight.

BACKGROUND

This section provides background information to facilitate a better understanding of the various aspects of the disclosure. It should be understood that the statements in this section of this document are to be read in this light and not as admissions of prior art.

Some VTOL aircraft include proprotor blades that can be folded to be oriented substantially parallel to pylon assemblies to minimize drag during some flight modes. In such aircraft, the proprotor blades may have a tendency to bend or deflect due to aerodynamic forces and aircraft maneuvering-induced forces. Bending and deflections in the proprotor blades can cause excess loading, for example, within a pitch-locking mechanism.

SUMMARY

This summary is provided to introduce a selection of concepts that are further described below in the detailed description. This summary is not necessarily intended to identify key or essential features of the claimed subject matter, nor is it intended to be used as an aid in limiting the scope of claimed subject matter.

A system for retaining a folded proprotor blade in flight. The system includes a rotary actuator mechanism operable to generate torque via a shaft that rotates about an axis generally parallel to a chordwise direction of the folded proprotor blade, a pair of clamping arms movable in a direction generally parallel to a beamwise direction of the folded proprotor blade, a pair of linkage arms interoperably responsive to the rotary actuator mechanism and coupled between the rotary actuator mechanism and the pair of clamping arms, and a first guide rod extending between the pair of clamping arms in the direction generally parallel to the beamwise direction.

A system for retaining a folded proprotor blade in flight. The system includes a rotary actuator mechanism operable to generate torque about an axis generally parallel to a spanwise direction of the folded proprotor blade, a pair of clamping arms rotatably movable in a plane generally perpendicular to a spanwise direction of the folded proprotor blade, a pair of linkage arms interoperably responsive to the rotary actuator mechanism and coupled between the rotary actuator mechanism and the pair of clamping arms, and a pair of rotation pins, each of which is connected to one of the pair of linkage arms and about which a respective one of the pair of clamping arms rotates responsive to torque generated via the rotary actuator mechanism.

A system for retaining a folded proprotor blade in flight. The system includes a rotary actuator mechanism operable to generate torque about an axis, a pair of clamping arms movable into and out of engagement with the folded proprotor blade responsive to the torque, and a pair of linkage arms interoperably responsive to the rotary actuator mechanism and coupled between the rotary actuator mechanism and the pair of clamping arms.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIGS. 4A-4C illustrate a proprotor blade-retention mechanism 400 in cooperation with the proprotor blade 202.

DETAILED DESCRIPTION

Various embodiments will now be described more fully with reference to the accompanying drawings. The disclosure may, however, be embodied in many different forms and should not be construed as limited to the embodiments set forth herein.

Figure 1A:
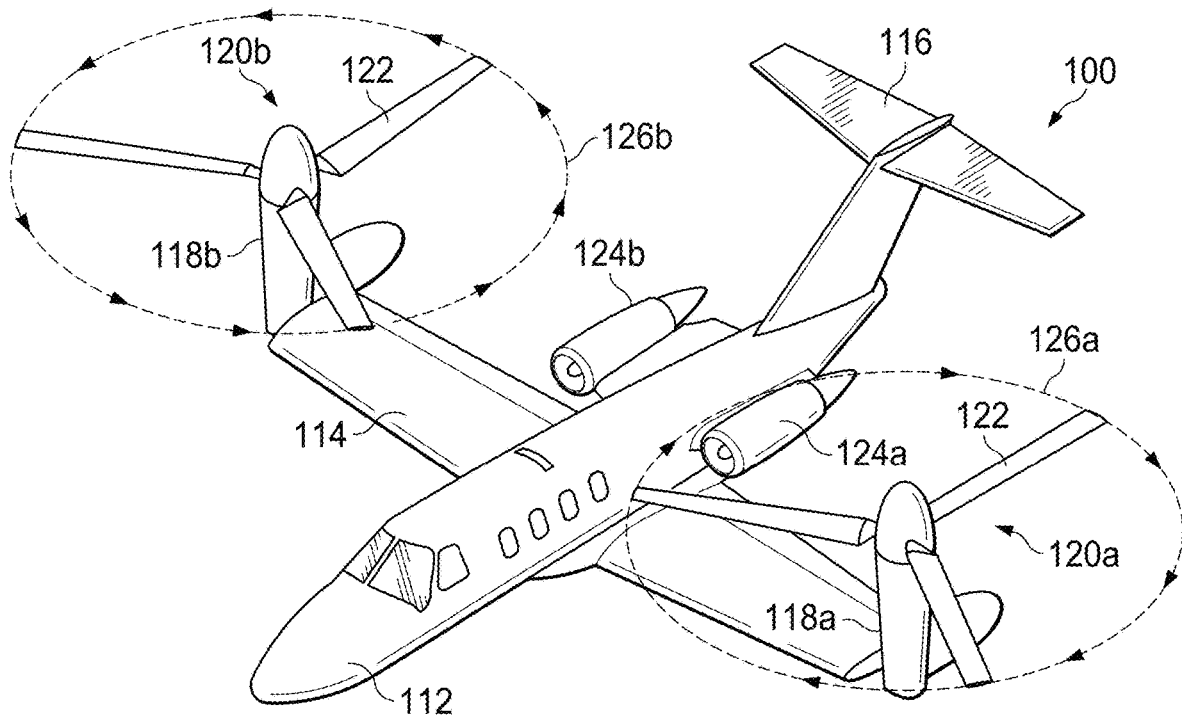
FIGS. 1A-1D illustrate a tiltrotor aircraft.
Figure 1B:
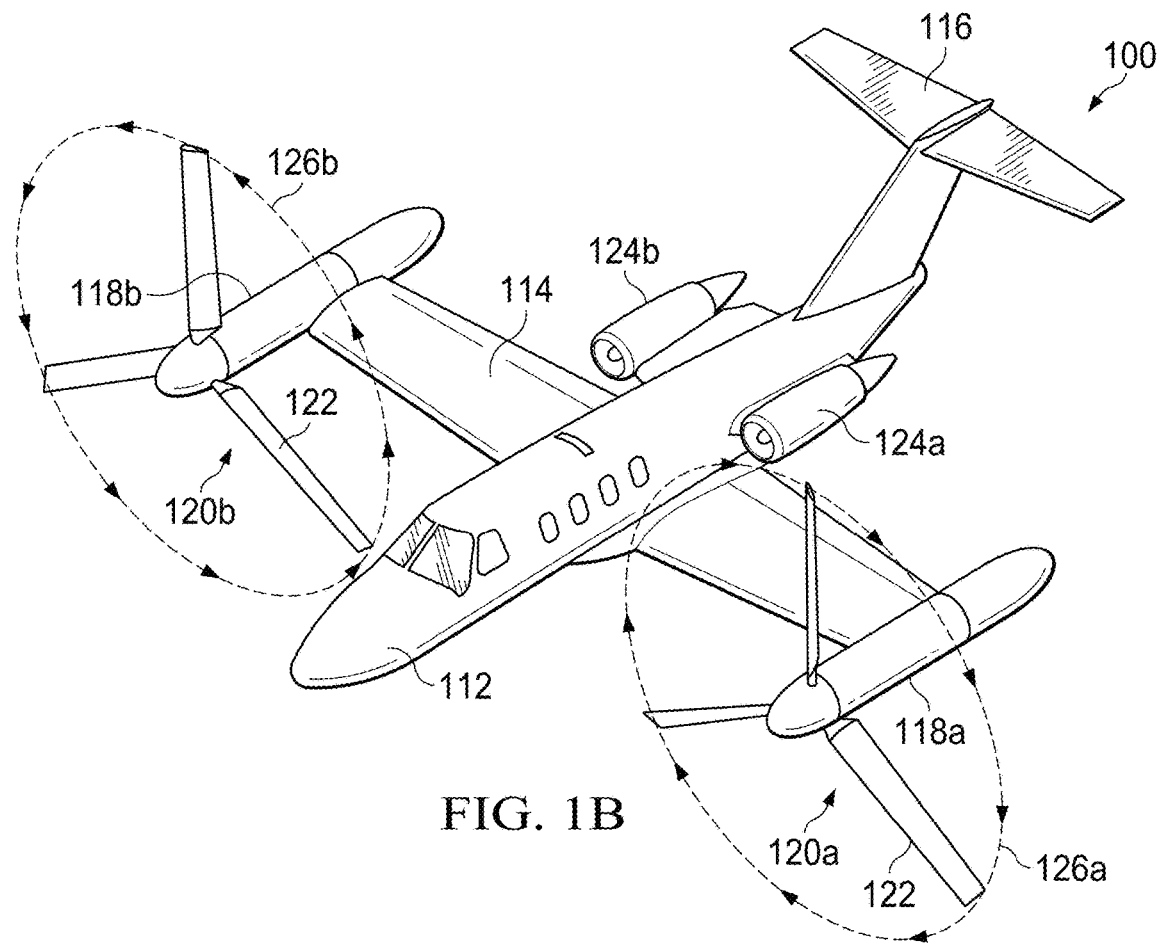
Figure 1C:
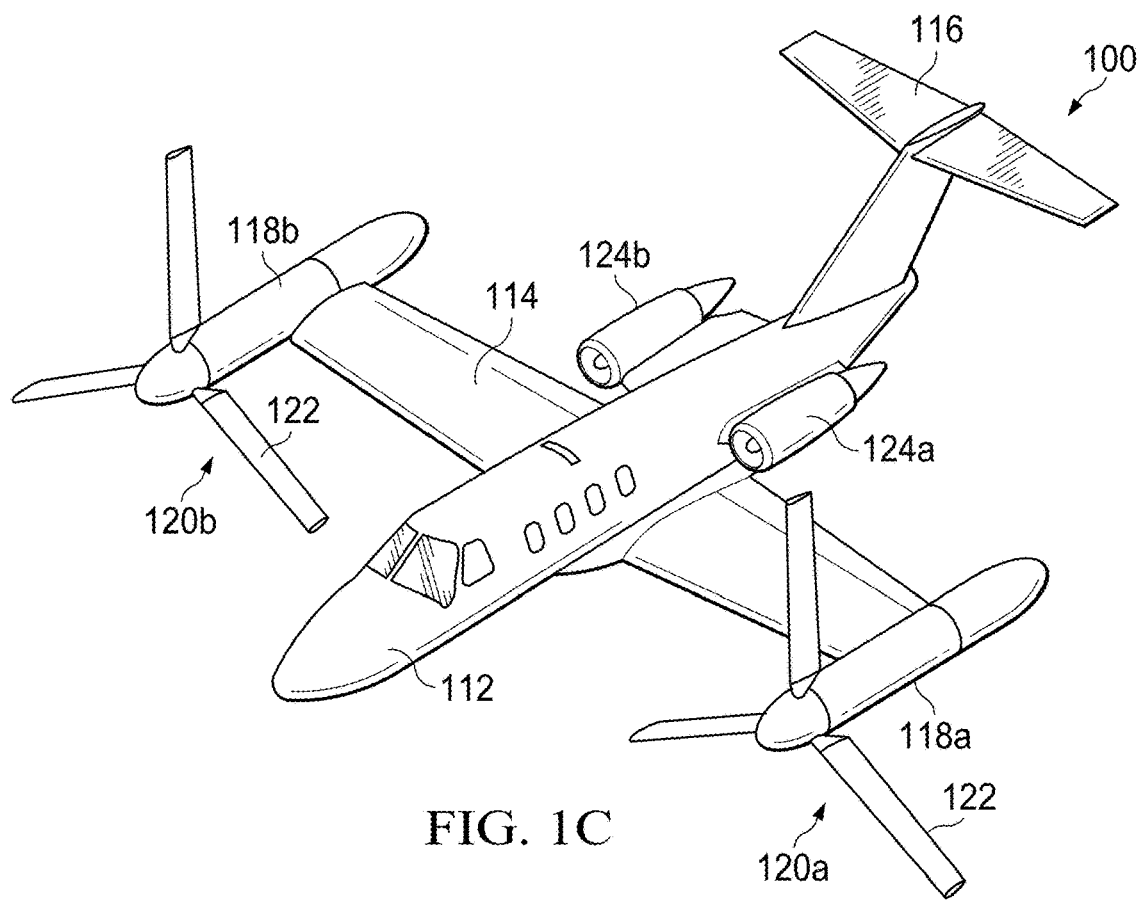
Figure 1D:
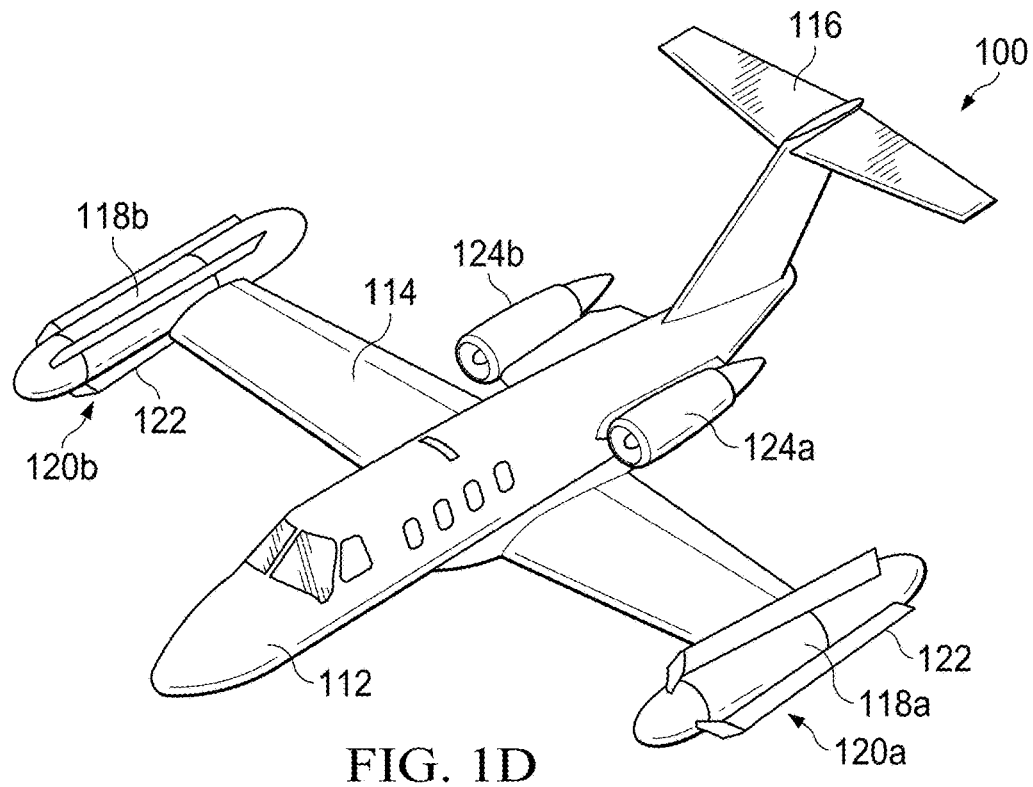

FIGS. 1A-1D illustrate a tiltrotor aircraft 100. The tiltrotor aircraft 100 includes a fuselage 112, a wing 114, and a tail assembly 116 including control surfaces operable for horizontal and/or vertical stabilization during forward flight. Located proximate outboard ends of the wing 114 are pylon assemblies (i.e., nacelles) 118a, 118b that are rotatable relative to the wing 114 between a generally vertical orientation, as best seen in FIG. 1A, and a generally horizontal orientation, as best seen in FIGS. 1B-1D. The pylon assemblies 118a, 118b each house a portion of a drive system used to rotate proprotor assemblies 120a and 120b, respectively. Each of the proprotor assemblies 120a and 120b includes a plurality of proprotor blades 122 operable to be rotated, as best seen in FIGS. 1A-1B, operable to be feathered, as best seen in FIG. 1C and operable to be folded, as best seen in FIG. 1D. In the illustrated embodiment, the proprotor assembly 120a is rotated responsive to torque and rotational energy provided by the engine 124a and the proprotor assembly 120b is rotated responsive to torque and rotational energy provided by the engine 124b. The engines 124a and 124b are located proximate an aft portion of the fuselage 112. The engines 124a and 124b are operable in a turboshaft mode, as best seen in FIGS. 1A-1B and a turbofan mode, as best seen in FIGS. 1C-1D.

FIG. 1A illustrates the tiltrotor aircraft 100 in VTOL or helicopter flight mode, in which proprotor assemblies 120a and 120b rotate in a substantially horizontal plane to provide a lifting thrust, such that the tiltrotor aircraft 100 flies much like a conventional helicopter. In this configuration, the engines 124a and 124b are operable in turboshaft mode, in which hot combustion gases in each of the engines 124a and 124b cause rotation of a power turbine coupled to an output shaft used to power the drive system coupled to the respective proprotor assemblies 120a and 120b. Thus, in this configuration, the tiltrotor aircraft 100 is considered to be in a rotary flight mode. FIG. 1B illustrates the tiltrotor aircraft 100 in proprotor forward flight mode, in which the proprotor assemblies 120a and 120b rotate in a substantially vertical plane to provide a forward thrust enabling the wing 114 to provide a lifting force responsive to forward airspeed, such that the tiltrotor aircraft 100 flies much like a conventional propeller-driven aircraft. In this configuration, the engines 124a and 124b are operable in the turboshaft mode and the tiltrotor aircraft 100 is considered to be in the rotary flight mode.

In the rotary flight mode of the tiltrotor aircraft 100, proprotor assemblies 120a, 120b rotate in opposite directions to provide torque balancing to the tiltrotor aircraft 100. For example, when viewed from the front of the tiltrotor aircraft 100 in proprotor forward flight mode (FIG. 1B) or from the top in helicopter mode (FIG. 1A), proprotor assembly 120a rotates clockwise, as indicated by motion arrows 126a, and proprotor assembly 120b rotates counterclockwise, as indicated by motion arrows 126b. In the illustrated embodiment, proprotor assemblies 120a, 120b each include three proprotor blades 122 that are equally spaced apart circumferentially at approximately 120 degree intervals. It should be understood by those having ordinary skill in the art, however, that the proprotor assemblies of the present disclosure could have proprotor blades with other designs and other configurations including proprotor assemblies having four, five or more proprotor blades. In addition, it should be appreciated that the tiltrotor aircraft 100 can be operated such that proprotor assemblies 120a, 120b are selectively positioned between proprotor forward flight mode and helicopter mode, which can be referred to as a conversion flight mode.

FIG. 1C illustrates the tiltrotor aircraft 100 in transition between proprotor forward-flight mode and airplane forward-flight mode, in which the engines 124a and 124b have been disengaged from the proprotor assemblies 120a and 120b and proprotor blades 122 of the proprotor assemblies 120a and 120b have been feathered, or oriented to be streamlined in the direction of flight, such that the proprotor blades 122 act as brakes to aerodynamically stop the rotation of the proprotor assemblies 120a and 120b. In this configuration, the engines 124a and 124b are operable in turbofan mode wherein hot combustion gases in each of the engines 124a and 124b cause rotation of a power turbine coupled to an output shaft used to power a turbofan that forces bypass air through a fan duct to create forward thrust enabling the wing 114 to provide a lifting force responsive to forward airspeed, such that the tiltrotor aircraft 100 flies much like a conventional jet aircraft. Thus, in this configuration, the tiltrotor aircraft 100 is considered to be in a non-rotary flight mode. FIG. 1D illustrates the tiltrotor aircraft 100 in airplane forward-flight mode, in which the proprotor blades 122 of the proprotor assemblies 120a, 120b have been folded to be oriented substantially parallel to the respective pylon assemblies 118a and 118b to minimize the drag force generated by the proprotor blades 122. In this configuration, the engines 124a and 124b are operable in the turbofan mode and the tiltrotor aircraft 100 is considered to be in the non-rotary flight mode. The forward cruising speed of the tiltrotor aircraft 100 can be significantly greater in airplane forward-flight mode versus proprotor forward-flight mode as the forward airspeed-induced proprotor aeroelastic instability is overcome.

Even though the tiltrotor aircraft 100 has been described as having two engines fixed to the fuselage, each operating one of the proprotor assemblies in the rotary flight mode, it should be understood by those having ordinary skill in the art that other engine arrangements are possible and are considered to be within the scope of the present disclosure including, for example, having a single engine that provides torque and rotational energy to both of the proprotor assemblies. In addition, even through the proprotor assemblies 120a and 120b are illustrated in the context of the tiltrotor aircraft 100, it should be understood by those having ordinary skill in the art that the proprotor assemblies disclosed herein can be implemented on other tiltrotor aircraft including, for example, quad tiltrotor aircraft having an additional wing member aft of wing 114, unmanned tiltrotor aircraft or other tiltrotor aircraft configurations.

When the proprotor blades 122 have been folded to be oriented substantially parallel to the respective pylon assemblies 118a and 118b to minimize drag, the proprotor blades in some cases may have a tendency to bend or deflect due to aerodynamic forces and aircraft maneuvering-induced forces. Bending and deflections in the proprotor blades 122 can cause excess loading, for example, within a pitch-locking mechanism.

It would therefore be advantageous to be able to hold the proprotor blades 122 steady during flight when in a folded position in order to reduce loads due to bending or deflection of the proprotor blades 122. Various embodiments disclosed herein actively hold the proprotor blades in place in a chordwise and a beamwise direction.

Figure 2:
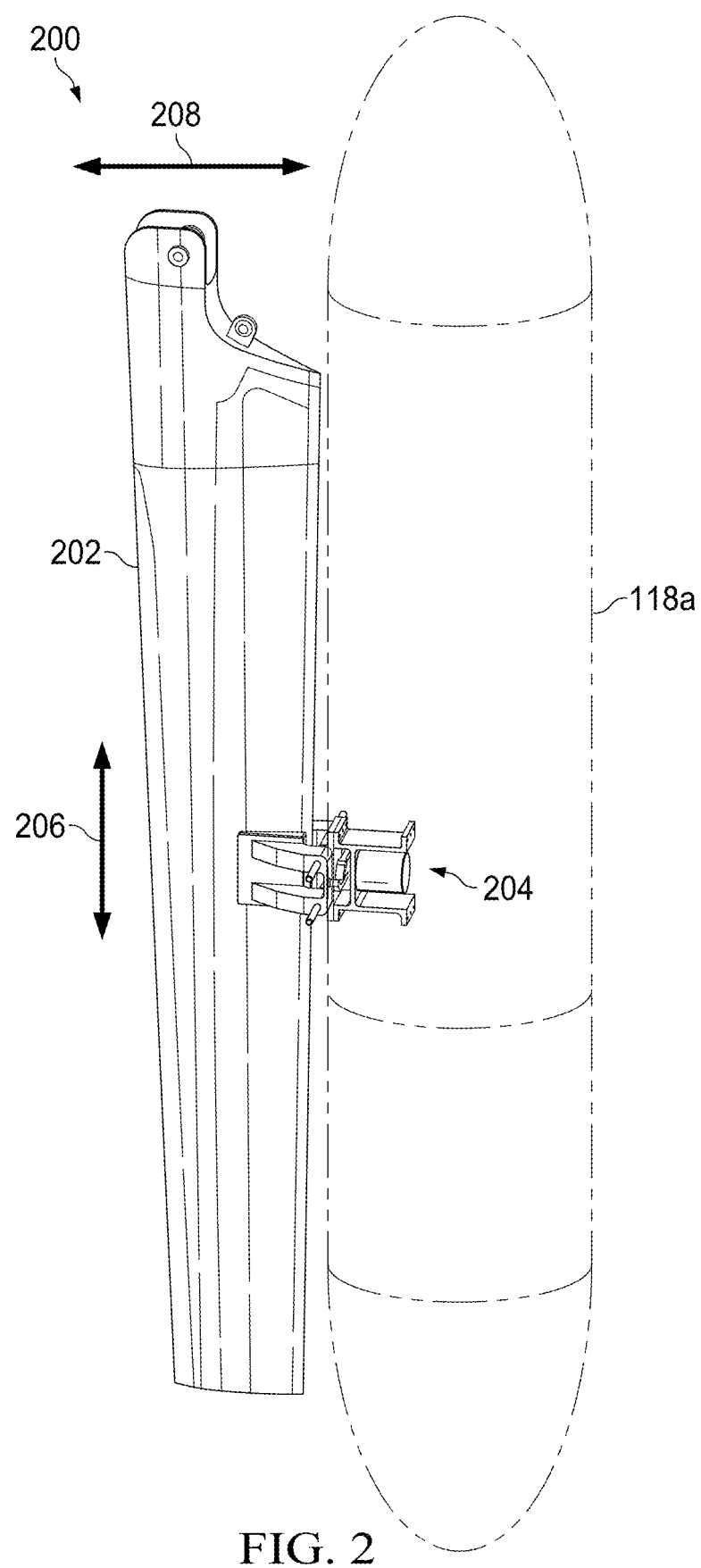
FIG. 2 is a side perspective view of an assembly that includes a proprotor blade and a proprotor blade-retention mechanism.

FIG. 2 is a side perspective view of an assembly 200, the assembly 200 including a proprotor blade 202, shown in part, and a proprotor blade-retention mechanism 204. In FIG. 2, the proprotor blade-retention mechanism 204 is shown restraining a trailing edge of the proprotor blade 202 in both a beamwise direction and a chordwise direction when the proprotor blade 202 is in a folded position. Arrow 206 illustrates a spanwise direction of the proprotor blade 202. Arrow 208 illustrates the chordwise direction of the proprotor blade 202. The beamwise direction of the proprotor blade 202 is generally into and out of the page. The proprotor blade-retention mechanism 204 is an active mechanism that clamps the proprotor blade 202.

Figure 3A:
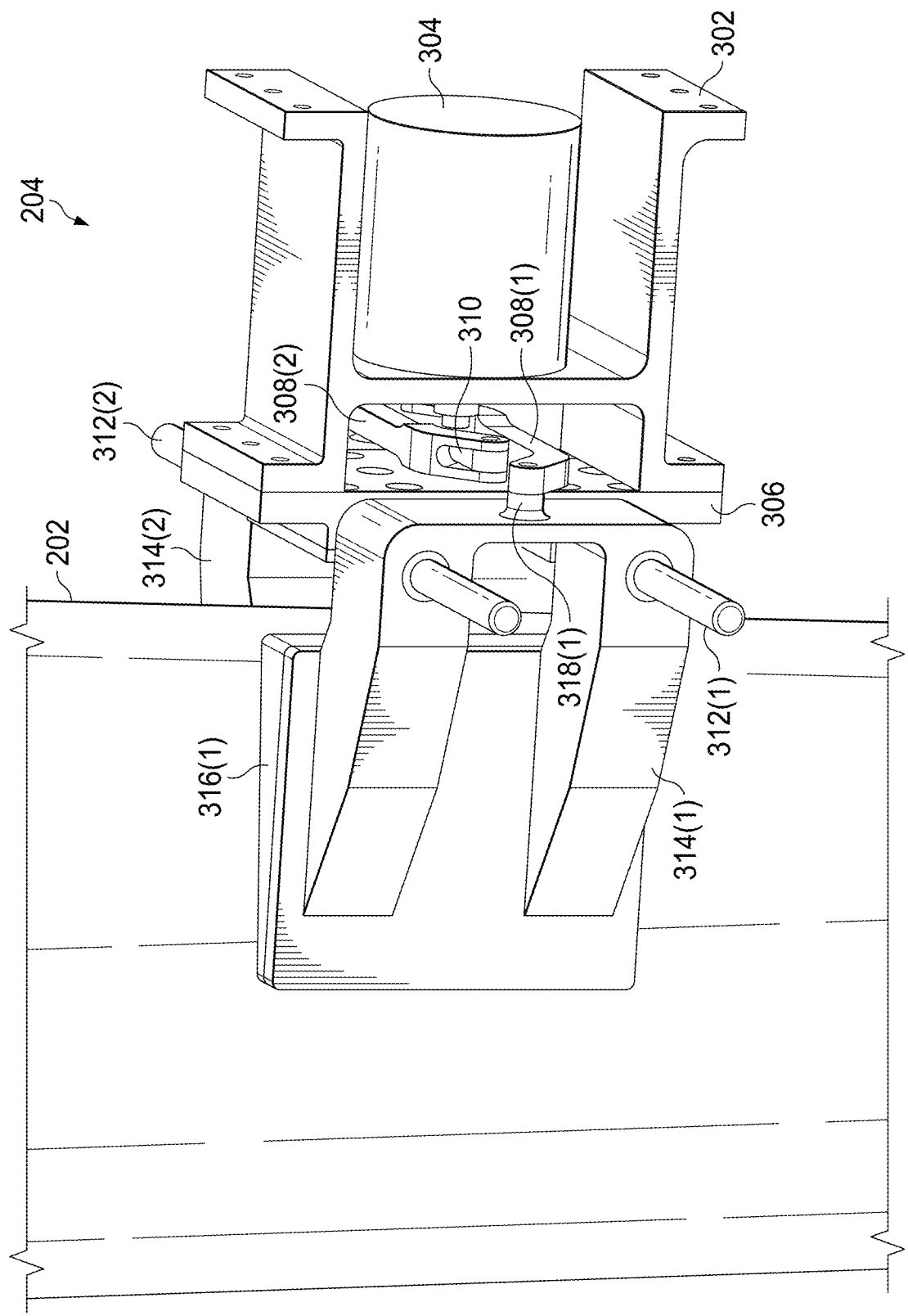
FIGS. 3A-3C illustrate the proprotor blade-retention mechanism of FIG. 2 in cooperation with a proprotor blade in more detail.
Figure 3B:
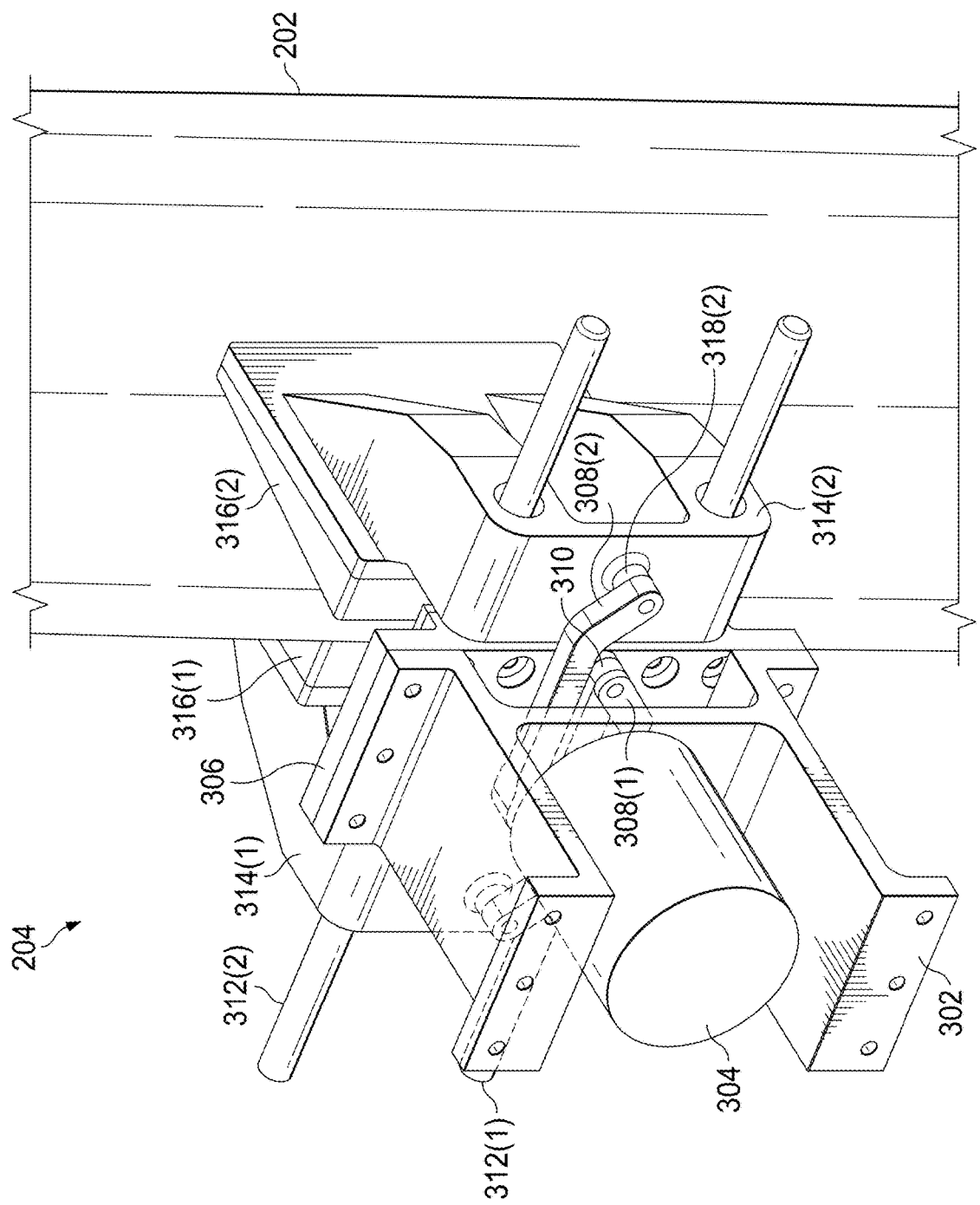
Figure 3C:
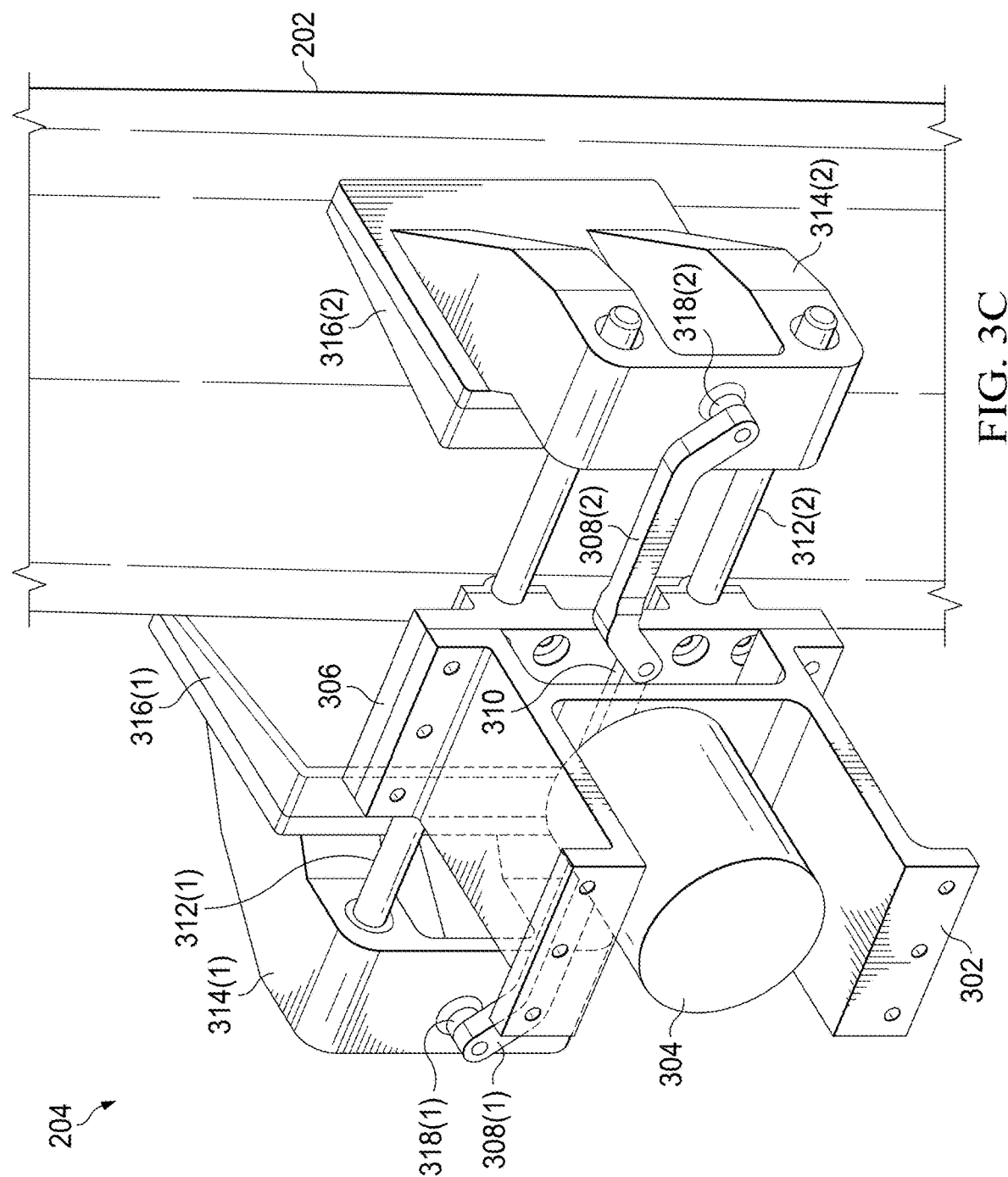

FIGS. 3A-3C illustrate the proprotor blade-retention mechanism 204 in cooperation with the proprotor blade 202 in more detail. The proprotor blade 202 is shown only in part. The proprotor blade-retention mechanism 204 is an active mechanism that clamps the proprotor blade 202. FIG. 3A is a side perspective view in which the proprotor blade-retention mechanism 204 is in a clamped position. FIG. 3B is a front perspective view of the proprotor blade-retention mechanism 204 in the clamped position. FIG. 3C is a front perspective view of the proprotor blade-retention mechanism 204 in an unclamped position.

The proprotor blade-retention mechanism 204 includes an attachment frame 302 to which various other components of the proprotor blade-retention mechanism 204 are attached as described in detail below. The attachment frame 302 is shown in FIGS. 3B-3C as transparent in order to allow otherwise-obscured components to be visible. A rotary actuator mechanism 304 is rotatably affixed to the attachment frame 302. The rotary actuator mechanism 304 includes a shaft that rotates about an axis generally parallel to a chordwise direction of the proprotor blade 202 in order to provide torque that causes the proprotor blade-retention mechanism 204 to clamp and un-clamp the proprotor blade 202.

The rotary actuator mechanism 304 is inter-operably coupled to a rotating connection arm 310 in order to cause the rotating connection arm 310 to rotate about the axis of rotation of the rotary actuator mechanism 304. The connection arm 310 is mounted to the shaft of the rotary actuator mechanism 304 and may be supplementally supported by a mounting plate 306 to which the attachment frame 302 is affixed. A pair of extension/retraction linkage arms 308(1)

and 308(2) are connected at opposite ends of the rotating connection arm 310 such that, responsive to rotation of the rotating connection arm 310 responsive to rotation of a shaft of the rotary actuator mechanism 304, the extension/retraction linkage arms 308(1) and 308(2) extend and retract in a generally beamwise direction of the proprotor blade 202 relative to the axis of rotation of the shaft of the rotary actuator mechanism 304.

Opposite ends of the extension/retraction linkage arms 308(1) and 308(2) are rotatably connected to clamping arms 314(1) and 314(2), the rotatable connections being shown at attachment points 318(1) and 318(2). Extension and retraction of the extension/retraction linkage arms 308(1) and 308(2) cause the clamping arms 314(1) and 314(2) to extend and retract in a generally beamwise direction of the proprotor blade 202 by sliding along guide rods 312(1) and 312(2).

The guide rods 312(1) and 312(2) are mounted to the mounting plate 306. The guide rods 312(1) and 312(2) are shown as cylindrical in shape and parallel to one another in a generally beamwise direction of the proprotor blade 202. Two linear bearings in corresponding openings in each of the clamping arms 314(1) and 314(2) permit the clamping arms 314(1) and 314(2) to slide along the guide rods 312(1) and 312(2).

The clamping arms 314(1) and 314(2) have attached thereto respective pads 316(1) and 316(2). In a typical embodiment, the pads 316(1) and 316(2) include one or more of rubber, NEOPRENE, TEFLON, open-cell foam, and closed-cell foam. In addition, depending upon design considerations, one or both of the clamping arms 314(1) and 314(2) and the pads 316(1) and 316(2) may be contoured in order to maximize engagement of the proprotor blade-retention mechanism 204 with the proprotor blade 202 when in the clamped position.

Figure 4B:
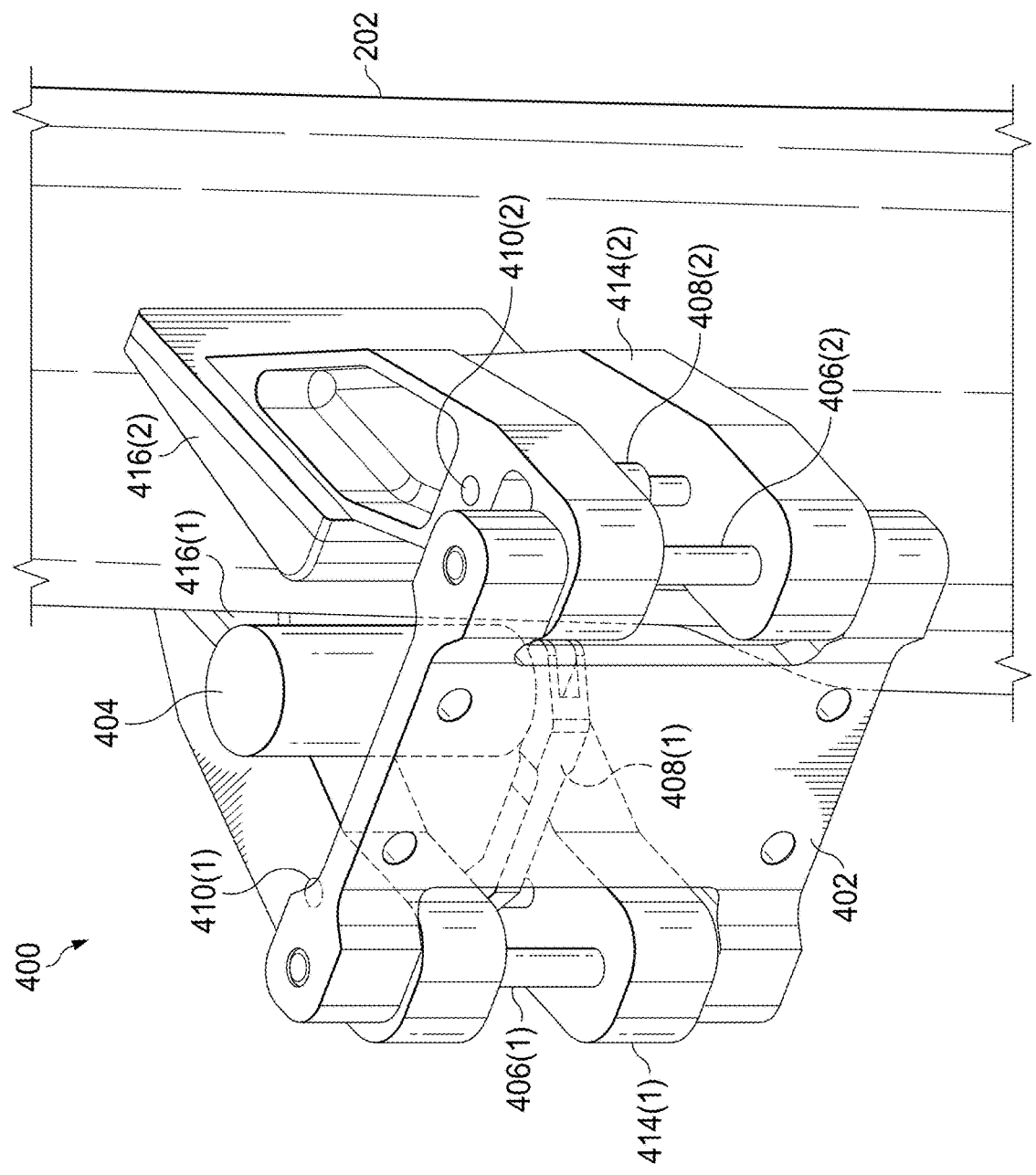
Figure 4C:
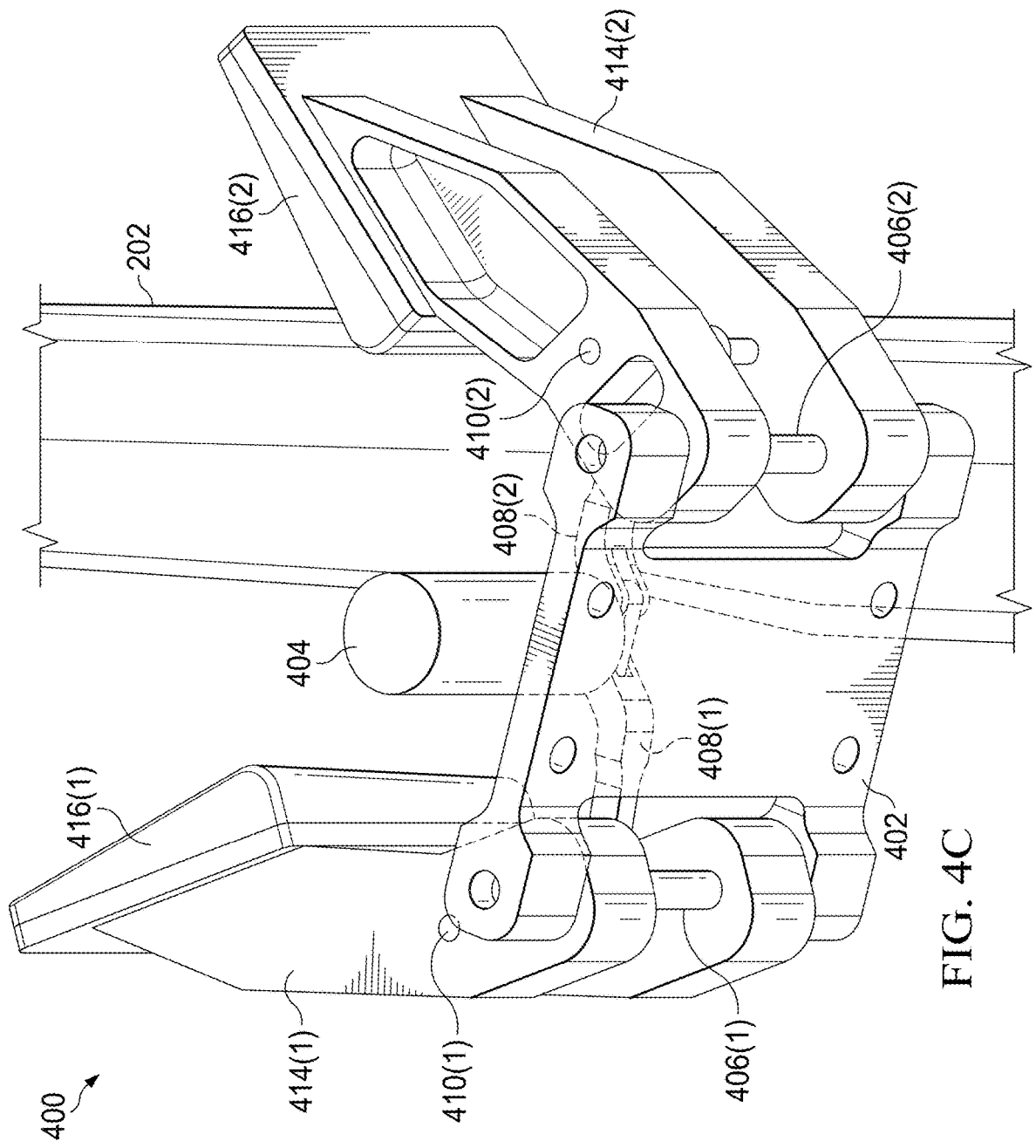

FIGS. 4A-4C illustrate a proprotor blade-retention mechanism 400 in cooperation with the proprotor blade 202. The proprotor blade 202 is shown only in part. FIG. 4A is a top plan view in which the proprotor blade-retention mechanism 400 is in an unclamped position. The proprotor blade-retention mechanism 400 is an active mechanism that clamps the proprotor blade 202. FIG. 4B is a front perspective view of the proprotor blade-retention mechanism 400 in a clamped position. FIG. 4C is a front perspective view of the proprotor blade-retention mechanism 400 in the unclamped position.

The proprotor blade-retention mechanism 400 includes an attachment frame 402 to which various other components of the proprotor blade-retention mechanism 400 are attached as described in detail below. The attachment frame 402 is shown in FIGS. 4B-4C as transparent in order to allow otherwise-obscured components to be visible and as having a general H shape. A rotary actuator mechanism 404 is rotatably affixed to the attachment frame 402. The rotary actuator mechanism 404 includes a shaft that rotates about an axis generally parallel to a spanwise direction of the proprotor blade 202 in order to provide torque that causes the proprotor blade-retention mechanism 400 to clamp and un-clamp the proprotor blade 202.

The rotary actuator mechanism 404 is inter-operably coupled to a pair of extension/retraction linkage arms 408(1) and 408(2) in order to cause the extension/retraction linkage arms 408(1) and 408(2) to extend and retract in a direction perpendicular to an axis of rotation of a shaft of the rotary actuator mechanism 304 and generally parallel to a beamwise direction of the proprotor blade 202. Opposite ends of the extension/retraction linkage arms 408(1) and 408(2) are rotatably coupled to clamping arms 414(1) and 414(2), illustrated as having a U shape, via respective connection pins 410(1) and 410(2) oriented generally parallel to a spanwise direction of the proprotor blade 202 and parallel to one another, the connection pin 410(1) passing through an upper portion, a lower portion, and an open space between the upper portion and the lower portion of a clamping arm 414(1) and the connection pin 410(2) passing through an upper portion, a lower portion, and an open space between the upper portion and the lower portion of a clamping arm 414(2). Extension and retraction of the extension/retraction linkage arms 408(1) and 408(2) cause the clamping arms 414(1) and 414(2) to rotate into and out of engagement with the proprotor blade in a plane generally perpendicular to the spanwise direction of the proprotor blade 202 via rotation of the clamping arms 414(1) and 414(2) about respective axes of rotation pins 406(1) and 406(2). The rotation pin 406(1) passes through an upper portion of the attachment frame 402, the upper portion of the clamping arm 414(1), the open space between the upper portion and the lower portion of the clamping arm 414(1), the lower portion of the clamping arm 414(1), and a lower portion of the attachment frame 402. In similar fashion, the rotation pin 406(2) passes through an upper portion of the attachment frame 402, the upper portion of the clamping arm 414(2), the open space between the upper portion and the lower portion of the clamping arm 414(2), the lower portion of the clamping arm 414(2), and a lower portion of the attachment frame 402. In some embodiments, the clamping arms 414(1) and 414(2) may be operable to fold up to −120 degrees in an unclamped position relative to a clamped position so that, for example, the clamping arms 414(1) and 414(2) could be retained inside the pylon assemblies 118a, 118b.

The clamping arms 414(1) and 414(2) have attached thereto respective pads 416(1) and 416(2). In a typical embodiment, the pads 416(1) and 416(2) include one or more of rubber, NEOPRENE, TEFLON, open-cell foam, and closed-cell foam. In addition, depending upon design considerations, one or both of the clamping arms 414(1) and 414(2) and the pads 416(1) and 416(2) may be contoured in order to maximize engagement of the proprotor blade-retention mechanism 400 with the proprotor blade 202 when in the clamped position.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within 10% of" what is specified.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A system for retaining a folded proprotor blade, the system comprising:
   a rotary actuator mechanism operable to generate torque via a shaft that rotates about an axis generally parallel to a chordwise direction of the folded proprotor blade;
   a pair of clamping arms movable in a direction generally parallel to a beamwise direction of the folded proprotor blade;
   a pair of linkage arms interoperably responsive to the rotary actuator mechanism and coupled between the rotary actuator mechanism and the pair of clamping arms; and
   a first guide rod extending between the pair of clamping arms in the direction generally parallel to the beamwise direction.

2. The system of claim 1, comprising a second guide rod extending between the pair of clamping arms parallel to the first guide rod.

3. The system of claim 2, comprising:
   an attachment frame that supports the rotary actuator mechanism;
   a mounting plate attached to the attachment frame;
   a rotating connection arm rotatably connected to the mounting plate and rotatable responsive to torque from the shaft; and
   wherein the first guide rod is retained by the mounting plate.

4. The system of claim 3, wherein the pair of linkage arms are connected at opposite ends of the rotating connection arm.

5. The system of claim 1, comprising a respective pad affixed to each respective clamping arm of the pair of clamping arms and adapted to contact the folded proprotor blade.

6. The system of claim 1, comprising:
   a respective pad affixed to each respective clamping arm of the pair of clamping arms and adapted to contact the folded proprotor blade; and
   wherein the pad comprises at least one of rubber, open-cell foam, and closed-cell foam.

7. The system of claim 1, wherein rotation of the shaft in a first direction causes the pair of clamping arms to converge on the folded proprotor blade in the direction generally parallel to a beamwise direction of the folded proprotor blade.

8. The system of claim 7, wherein rotation of the shaft in a second direction causes the pair of clamping arms to diverge from the folded proprotor blade in the direction generally parallel to a beamwise direction of the folded proprotor blade.

9. A system for retaining a folded proprotor blade, the system comprising:
   a rotary actuator mechanism operable to generate torque about an axis generally parallel to a spanwise direction of the folded proprotor blade;
   a pair of clamping arms rotatably movable in a plane generally perpendicular to a spanwise direction of the folded proprotor blade;
   a pair of linkage arms interoperably responsive to the rotary actuator mechanism and coupled between the rotary actuator mechanism and the pair of clamping arms; and
   a pair of rotation pins, each of which is connected to one of the pair of linkage arms and about which a respective one of the pair of clamping arms rotates responsive to torque generated via the rotary actuator mechanism.

10. The system of claim 9, comprising:
    an attachment frame; and
    wherein the attachment frame retains the pair of clamping arms via the pair of rotation pins; and
    wherein the rotary actuator mechanism comprises a shaft that rotates about an axis generally parallel to a spanwise direction of the folded proprotor blade.

11. The system of claim 9, wherein the rotary actuator mechanism comprises a shaft that rotates about an axis generally parallel to the spanwise direction of the folded proprotor blade.

12. The system of claim 9, wherein the pair of linkage arms are coupled to the pair of clamping arms via a pair of connection pins.

13. The system of claim 9, comprising:
    a respective pad affixed to each respective clamping arm of the pair of clamping arms and adapted to contact the folded proprotor blade; and
    wherein the pad comprises at least one of rubber, open-cell foam, and closed-cell foam.

14. The system of claim 9, wherein rotation of a shaft of the rotary actuator mechanism in a first direction causes the pair of clamping arms to converge on the folded proprotor blade in the plane generally perpendicular to the spanwise direction of the folded proprotor blade.

15. The system of claim 9, wherein rotation of a shaft of the rotary actuator mechanism in a first direction causes the pair of clamping arms to diverge from the folded proprotor blade in the plane generally perpendicular to the spanwise direction of the folded proprotor blade.

16. The system of claim 9, wherein the pair of clamping arms are operable to be folded into a pylon assembly when the pair of clamping arms are in an unclamped position.

17. A system for retaining a folded proprotor blade, the system comprising:
    a rotary actuator mechanism operable to generate torque about an axis;
    a pair of clamping arms movable into and out of engagement with the folded proprotor blade responsive to the torque; and
    a pair of linkage arms interoperably responsive to the rotary actuator mechanism and coupled between the rotary actuator mechanism and the pair of clamping arms.

18. The system of claim 17, comprising a respective pad affixed to each respective clamping arm of the pair of clamping arms and adapted to contact the folded proprotor blade.

19. The system of claim 17, comprising an attachment frame that supports the rotary actuator mechanism and the pair of clamping arms.

20. The system of claim 17, wherein movement by the pair of clamping arms into and out of engagement with the folded proprotor blade is selected from the group consisting of linear in a direction generally parallel to a beamwise direction of the folded proprotor blade and rotational in a plane generally perpendicular to a spanwise direction of the folded proprotor blade.

\* \* \* \* \*